June 18, 1940. W. J. LARKIN, JR 2,205,146
RADIO AND LIKE SOCKET
Filed Dec. 8, 1937
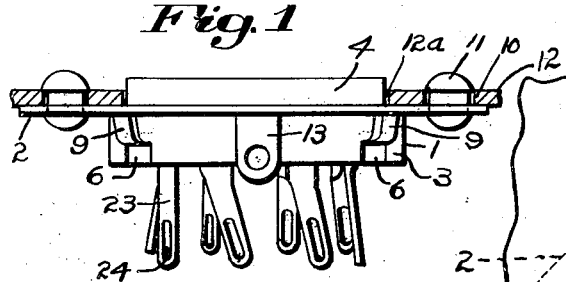
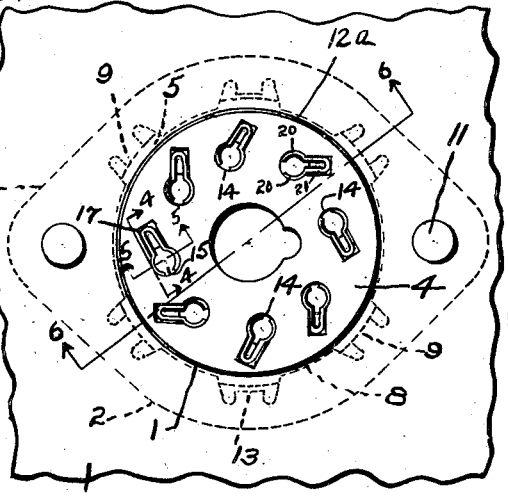
Inventor:
William J. Larkin, Jr.
by Walter J. Jones
Att'y Patented June 18, 1940

2,205,146

UNITED STATES PATENT OFFICE 2,205,146

RADIO AND LIKE SOCKET

William J. Larkin, Jr., Malden, Mass., assignor to National Company, Inc., Malden, Mass., a corporation of Massachusetts Application December 8, 1937, Serial No. 178,764

3 Claims. (Cl. 173—328)

My invention aims to provide improvements in socket devices, particularly, though not exclusively, useful in connection with the reception of the prongs of a radio tube.

In the drawing, which illustrates a preferred embodiment of my invention:

Figure 1 is a plan view of my socket device in assembly with a supporting panel shown in cross-section;

Fig. 2 is a top view of the installation shown in Fig. 1;

Fig. 3 is a bottom view of the installation shown in Fig. 1;

Fig. 4 is an enlarged section taken along the line 4—4 of Fig. 2;

Fig. 5 is an enlarged section taken along the line 5—5 of Fig. 2;

Fig. 6 is a section taken along the line 6—6 of Fig. 2 with the contact members omitted;

Fig. 7 is a top view of the parts shown in Fig. 4;

Fig. 8 is a top view of my fastener member per se; and

Fig. 9 is a side view of the contact member shown in Fig. 8.

The particular socket structure illustrated by the accompanying drawing comprises a body member, a metal collar 2 assembled with the body member and a plurality of contact members carried by the body member. The body member 1, in my preferred form, is of insulating material and comprises a base portion 3 and a circular reduced portion 4 having a smaller diameter than the base portion 3 so as to provide a ledge portion 5 (Fig. 6) extending around the reduced portion 4. At spaced intervals around the base portion 3 I have formed openings 6 extending upwardly into the base from the lower face thereof and providing shoulders 7 (Fig. 6) at their closed ends for a purpose to be described. The metal collar 2 is of substantially elliptical form having an aperture 8 therein slightly larger in diameter than the diameter of the reduced portion 4 of the body member 1 but smaller in diameter than the diameter of the base portion 3 whereby the collar 2 is supported by the ledge of the body member with the reduced portion 4 extending through the aperture 8. As a means for securing the collar member to the body member I have provided lug portions 9 extending from material of the collar 2, in my preferred form, adjacent the aperture 8 and provided with hook-shaped free ends adapted to engage the shoulders 7 of the openings 6 to secure the parts firmly together. At opposed ends of the collar 2 I have formed openings 10 (Fig. 1) for receiving suitable attaching members, such as a rivet 11, for securing the socket device to a metal supporting panel 12. The supporting panel 12 has an aperture 12a therein through which extends that portion of the reduced portion 4 of the body member extending beyond the plane of the collar member. In my preferred form of socket device I have provided soldering lugs 13 integral with the metal collar 2 and adapted to receive wires (not shown) from parts of a radio apparatus for grounding said parts to the supporting panel 12 by means of direct contact between this member and the collar 2. A plurality of hollow seats 14 are formed in the body member 1 for receiving the contact members. Each of the hollow seats 14, as most clearly shown in Figs. 4 and 7, has a substantially circular aperture 15 extending from the outer face 16 of the portion 4 of the body member entirely through the body member and a substantially elongated opening 17 adjacent the aperture 15 extending from the open face of the portion 4 partly through the body member. Material 18 of the portion 4 adjacent its open face 16 extends into the aperture 15, as most clearly shown in Fig. 5, forming a shoulder 19 for a purpose to be described.

Each of the contact members is formed from a single piece of spring material and has a pair of yieldable portions 20—20 spaced one from another and bent to provide a circular-like opening for receiving a contact prong (not shown) of a tube member. The yieldable portions 20—20 are connected together at their sides by a laterally-extending loop portion 21. At the upper free ends of the yieldable portions 20—20 I have provided flared-out portions 22—22 adapted to effect assembly of the contact members with the body member 1 in a manner to be described. My preferred contact member is provided with a soldering lug 23 formed as a continuation of one of the yieldable portions 20 and having an aperture 24 for receiving an end of a wire (not shown) to be soldered, or otherwise secured, to the contact member.

Assembly of the contact members with the body member 1 is a relatively simple matter and may be carried out manually through moving each of the contact members into a respective hollow seat 14 from outside the face 16 of the portion 4 of the body member so that the yieldable portions 20—20 are disposed within the aperture 15 and the loop portion 21 is disposed within the elongated aperture 17. The contact member is moved through the hollow seat until the outwardly-flared portions 22—22 engage the projecting portion 18 causing the yieldable portions 20—20 to contract to permit passage by the portion 18, at which time they expand to position the outwardly-flared portion 22—22 behind the shoulder 19. Thus the shoulder 19 prevents removal of the contact member in the direction from which it was inserted and the closed end 25 (Fig. 4) of the elongated aperture 17 prevents movement of the contact member through the hollow seat in the direction of insertion. The contact members are now securely assembled with the body member 1 in position to receive cooperating contact prongs of a tube member (not shown) and at the same time the yieldable portions 20—20 of the respective members are free to expand slightly upon receiving the contact prongs. It is to be noted that, while the contacts cannot become disassembled accidentally, they are free to float in the apertures thus adapting themselves easily to the prongs when inserted. It is also apparent that the outwardly-flared portions 22—22 serve a double purpose in that they comprise not only a means for securing assembly of the contact members with the body member, but, also, a lead for effecting an easy entrance of the contact prongs between the yieldable portions 20—20.

Thus it will be seen that my improved socket device is made up of relatively inexpensive parts which are very easily assembled, especially with respect to the assembly of the contact members with the body member.

Although I have illustrated and described a preferred embodiment of my invention, I do not wish to be limited thereby because the scope of my invention is best defined by the following claims.

I claim:

1. An electrical socket comprising, in combination, a body member of insulating material, said body member having an aperture extending entirely therethrough and an opening adjacent said aperture extending partly therethrough so as to be closed at its inner end, said body member having a projecting portion extending into said aperture providing a shoulder, a metal contact member having yieldable portions connected at one side and adapted to receive a prong between them, said yieldable portions being snapped by said projecting portion into said aperture, and said connected side being seated in said opening, the closed end of said opening and said shoulder combining to prevent removal of said contact member from said body member.

2. An electrical socket comprising, in combination, a body member of insulating material, said body member having a substantially circular aperture extending entirely therethrough and an elongated opening adjacent said aperture extending partly therethrough so as to be closed at its inner end, said body member having a projecting portion extending into said circular aperture providing a shoulder, a metal contact member having bowed yieldable portions adapted to receive a contact prong between them, a laterally-extending loop portion connecting said yieldable portions at one side, said yieldable portions being snapped by said projecting portion into said aperture whereby said shoulder limits movement of said contact member in a direction opposite to that of its insertion, said loop portion being seated within said elongated opening and the closed end of said last-mentioned opening limiting movement of said contact member in the direction of its insertion.

3. An electrical socket comprising, in combination, a body member of insulating material, said body member having an aperture extending therethrough and an opening adjacent said aperture extending partly therethrough so as to be closed at its inner end, said body member having a projecting portion extending into said aperture providing a shoulder, a metal contact member having yieldable portions connected at one side adapted to receive a prong between them, said yieldable portions having outwardly-flared portions at their ends, said yieldable portions being snapped by said projecting portion whereby said outwardly-flared portions are disposed behind said shoulders to limit movement of said contact member in a direction opposite to that of its insertion, a soldering lug extending from one of said yieldable portions beneath said body member, and said connected side being seated in said opening and the closed end of said opening limiting movement of said contact member in the direction of its insertion.

WILLIAM J. LARKIN, Jr.